Aug. 22, 1961   A. C. KISH   2,997,208
BEVERAGE DISPENSING DEVICE
Filed Nov. 17, 1958   2 Sheets-Sheet 1

INVENTOR
ARNOLD C. KISH

BY Charles T. Lombard
ATTORNEY

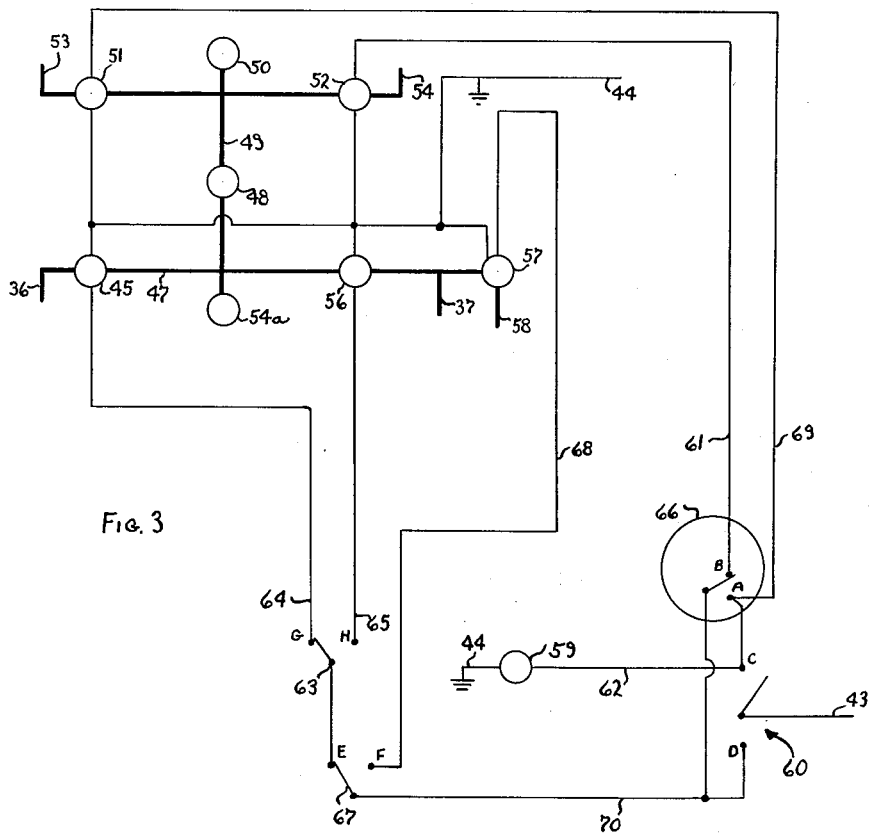

United States Patent Office
2,997,208
Patented Aug. 22, 1961

2,997,208
BEVERAGE DISPENSING DEVICE
Arnold C. Kish, 1037 W. 25th St., Erie, Pa.
Filed Nov. 17, 1958, Ser. No. 774,272
9 Claims. (Cl. 222—70)

This invention relates to dispensing devices and, more particularly, to dispensing devices for dispensing beer and other carbonated beverages from containers such as kegs.

In dispensing beer from kegs, it has long been a problem to retain the proper amount of carbon dioxide gas dissolved in the beer. It has been discovered that the carbon dioxide gas which is normally dissolved in the beer escapes through the faucet when beer is drawn from the keg and, therefore, the dissolved gas or carbon dioxide in the beer is not necessarily controlled by the amount of air or gas collected over the top of the beer for the purpose of applying pressure for dispensing. In other words, the beer can reach a state in which it contains less than the optimum amount of dissolved gas even though the amount of gas which is mixed with air over top of the beer is considerable.

By increasing the amount of carbon dioxide in the gas to add pressure to the beer, gas can be added to the dissolved gas content of the beer; however, if gas is exclusively used for this purpose, the beer will absorb an undesirably large amount of gas and will become "wild." On the other hand, if pure air is used for applying pressure to the top of the beer, the beer may become decarbonated and flat. In order to obtain a proper balance of carbon dioxide in the beer at all times, the present invention provides a means for applying either gas selectively to the top of the beer for air or, on the other hand, selectively applying either air or gas to the bottom of the keg whereby it can bubble up through the beer and, thereby, be absorbed more rapidly than when disposed over the top of the beer only. The present invention provides a means for bleeding off the gas above the beer so that it can be replaced by air or another gas if desired.

It is, accordingly, an object of this invention to provide an improved means for dispensing beer and, more particularly, it is an object to provide a means for dispensing beer which is simple in construction, economical to manufacture, and simple and efficient to use.

Another object of the invention is to provide an improved dispensing device for beer and other carbonated beverages.

A further object of the invention is to provide a dispensing device whereby air or gas can be selectively applied, either to the space above the beer or down through the beer itself to apply a pressure finally to the top surface of the beer in the keg for dispensing.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

FIG. 3 shows a wiring and piping diagram of the invention.

Figure 2:
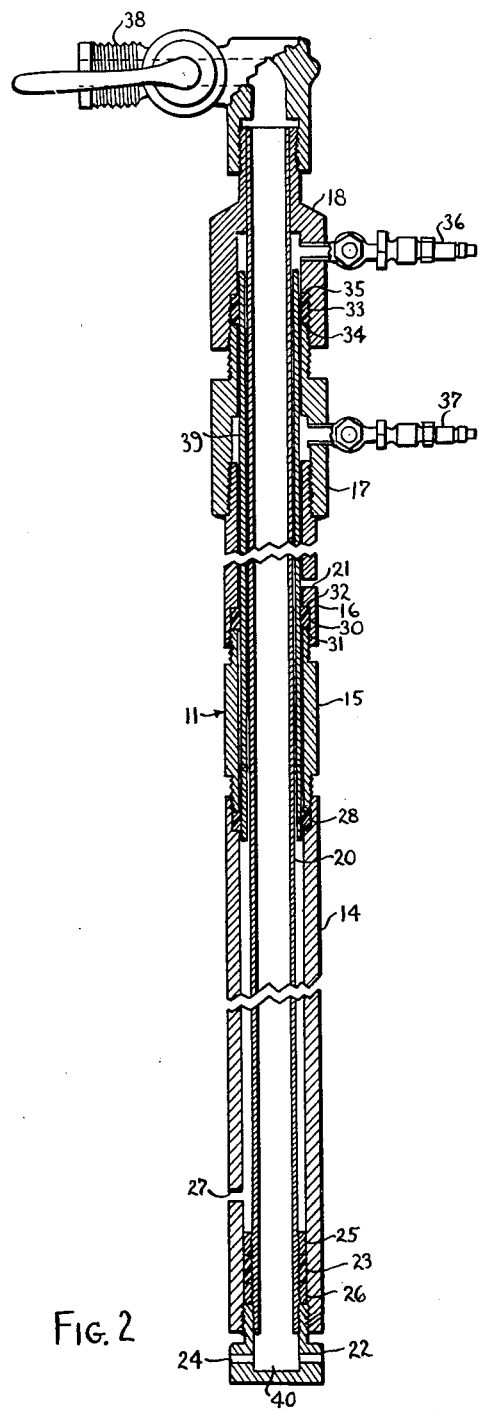
FIG. 2 is a longitudinal cross sectional view of the dispensing device taken on line 2—2 of FIG. 1.
Figure 1:
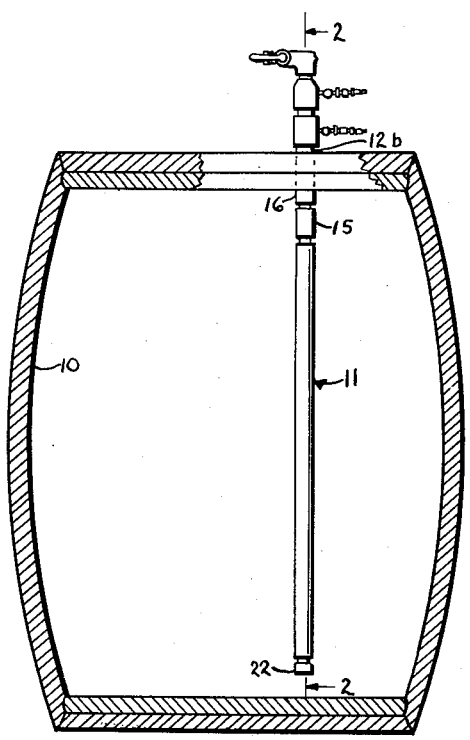
FIG. 1 is a cross sectional view of a beer keg according to the invention.

Now with more particular reference to the drawings, a keg 10 is shown having a dispenser 11 therein which extends through the top of the keg 10 and is attached thereto either by the usual bayonet type connection or other well known fastening type connection. The dispenser 11 is made principally of an outer lower tube 14, a beer rod 20, and couplings 36 and 37, along with a cock 38 with suitable sealing means and baffling means connected therebetween.

The dispensing device 11 has the outer lower tube 14 threadably connected at its upper end to an outer intermediate tube 15 with a seal 28 disposed therebetween. The seal 28 is in the form of a hollow cylindrical resilient member such as rubber, plastic, or the like and it is disposed between the internal shoulder below the internal threads on the outer lower tube 14 and the end of the outer intermediate tube 15. Therefore, when the outer intermediate tube 15 and the outer lower tube 14 are tightened together, they squeeze the seal 28 therebetween and compress it and cause it to sealingly engage the outer surface of an inner intermediate tube 39.

In like manner, packing 30 is compressed between an end 31 of the intermediate tube 15 and the shoulder formed at the terminus of the internal threads on the lower ends of an outer gas sleeve 16 which forms a shoulder 32. A hole 21 is formed through the outer gas sleeve 16 and the hole 21 conducts gas from the coupling 37 through the space into an outer dispensing sleeve 17, through the space between the outer gas sleeve 16 and the intermediate tube 39, and to the space above the top of the beer in the keg 10. The outer gas sleeve 16 extends through an opening in the keg at 10 at 12b.

The lower end of the outer lower tube 14 terminates in an internal threaded portion and the internal threaded portion receives the external threads on a plug 22. The plug 22 has a bore 40 and laterally spaced bores 24 communicating with the internal bore 40. The lower end of the beer rod 20 is externally threaded and has spaced nuts 25 and 26 threadably supported thereon with hollow cylindrical resilient packing 23 disposed therebetween. The nuts 25 and 26, when tightened, compress the packing 23 and form a seal between the beer rod 20 and the inside surface of the outer lower tube 14, thereby preventing any entrance of fluid between the outer tube 14 and the beer rod 20. Therefore, a flow path is provided from the coupling 36 into the space within a head 18, thence down between the inside surface of the intermediate tube 39 and the outside surface of the beer rod 20 to the space between the outside of the beer rod 20 and the inside of the lower tube 14 and out through holes 27.

Packing 33 is compressed between a shoulder 35 on the head 18 and an upper end 34 of the outer dispensing sleeve 17. Therefore, when air is applied to the coupling 36, it passes down through the passage previously described and out the holes 27 and bubbles up through the beer to accumulate over the top surface of the beer. When a gas is put through the coupling 37, it passes through the passage between the intermediate tube 39 and the outer gas sleeve 16 and out the hole 21 to the space over the top of the beer.

In FIG. 3, a circuit is shown for selectively connecting air and gas to the couplings 36 and 37. The circuit includes a timer 66 and a regulator 48. With the circuit connected as shown, the gas may be put either above or into the beer for a predetermined time at a predetermined pressure regulated by the regulator 48 and, on the other hand, air can be selectively put either into the bottom of the beer or directly over the top during a predetermined time. If the operator so desires, the gas or air may be left on for a longer time, for example, all night, if the beer is over-carbonated or under-carbonated and needs to have either air or gas supported thereon for a longer period of time or bubbled up through it for a longer time.

In FIG. 3, electrical lines are shown in light lines and pipes in heavy lines. The circuit shown in FIG. 3 may be connected to the device shown in FIG. 2 with the parts numbered 36 and 37 in each figure connected to corresponding numbered parts. The coupling 36 is connected through a solenoid valve 45 to a line 47 which is connected to a gauge 54a and through the regulator 48 to line 49 which is in turn connected through a T to a gauge 50, to a solenoid valve 51 and a solenoid valve 52. A line 53 may be connected to a source of compressed gas and a source of compressed air may be connected to a line 54. The line 47 is also connected through a solenoid valve 56 to the coupling 37 and the coupling 37 is connected to a solenoid valve 57 and thence to a discharge line 58 which communicates with the atmosphere. The electrical circuit line 44 is connected to one side each of a light 59 and to one side of the valves 45, 51, 52, 56, and 57.

A switch 60 is a double throw double pole switch having its common terminal connected to a power line 43 and it selectively connects lines 62 and 70 to the power line 43. The solenoid valve 51 and the light 59 are connected to the line 62 and a line 69. The solenoid valve 52 is connected to a line 61. The solenoid valve 51 connects gas from the line 53 to the line 49 to the regulator 48 at constant pressure to the line 47 which is connected to both valves 45 and 56. The gauge pressure of the incoming gas to the line 49 will be measured on the gauge 50 and the regulated pressure to the line 47 by the gauge 54a. With a switch 67 in the position shown and the switch 60 connecting the line 70 to the line 43 by closing a switch 63 selectively to either line 64 or 65, the gas or air in the line 49 may be admitted selectively to either the coupling 36 or the coupling 37.

When the switch 60 has closed to the C position, power from the line 43 flows through the line 62 to the light 59 and to the solenoid valve 51, applying gas under pressure to the line 49 and the regulator 48. The gas pressure can be either put on top of the liquid in the keg 10 or under at the bottom through the holes 27 for a predetermined time by closing the timer 66 to the A position and by selectively operating the switch 63 to the G or to the H position to the line 64 or 65. After a predetermined time, the timer 66 will move to the B position. If it is desired to bleed out the gas from the top of the liquid so that a different gas can replace it or so that gas can be bubbled up through the liquid continuously by admitting it through the holes 27, the switch 67 will be closed to the F position, connecting power to a line 68 and opening the valve 57 so that air can escape from on top of the beer through the hole 21 and out the coupling 37 and the line 58 to the ambient atmosphere. The switch 67 will be spring urged toward the position shown so that the operator will have to hold it in the position shown so as to avoid the possibility of leaving the valve 57 open inadvertently.

Air can also be put into the barrel selectively through either the coupling 36 or 37 by closing the switch 60 to the D position and the timer 66 to the A position, thereby connecting power from the line 43 through a line 70 to the solenoid valve 52, opening the valve 52 and allowing air to flow from the line 53 through the line 49, the regulator 48, to the line 47 and the gauge 54a. With the switch 67 in the E position, gas can either be put on top or into the liquid in the keg 10 by operating the switch 63 as aforesaid to either the G or H position to open either the valve 45 or the valve 56.

If it is desired to bubble gas through the liquid for a predetermined period of time, the switch 60 will set in the D position, the timer 66 will set in the A position, and they will remain in those positions for a predetermined time. The valve 51 will be held open until the timer 66 moves to the B position and gas will either go through the coupling 36 or the coupling 37, depending upon the setting of the switch 63. As soon as the timer 66 moves to the B position after the predetermined time, the power will be disconnected from the line 69 and the valve 51 and, therefore, the gas will be shut off from the line 49. The timer 66 can also be used when it is desired to carbonate the beverage for only a predetermined period of time. After the timer 66 returns to the B position, air will again be applied to the couplings 36 and 37. The timer 66 may be chosen to operate for a time of several hours maximum and be adjustable for any suitable interval less than this.

The foregoing specification sets forth the invention in its preferred practical forms but the structure shown is capable of modification within a range of equivalents without departing from the invention which is to be understood is broadly novel as is commensurate with the appended claims.

What is claimed is:

1. A device for use in a container for carbonating and decarbonating beverages and dispensing said beverages under pressure comprising an outer tube, an intermediate tube, a beer rod, first sealing means connecting said outer tube and said beer rod together adjacent the lower end thereof and defining a first flow passage therebetween from the upper end outside said container to a point adjacent the bottom of the inside of said container, said dispensing device having intermediate sealing means between the top and bottom thereof for attaching it to said container, means to connect a supply of compressed gas to a coupling connected to said first flow passage, a second flow passage, said second flow passage defined by said intermediate tube and said outer tube, second sealing means connecting said outer tube and said intermediate tube below said coupling, an opening adapted to communicate with said second flow passage and the inside of said container adjacent the top thereof, and a dispensing means on the upper end of said beer rod and communicating with the inside bottom of said container.

2. The device recited in claim 1 wherein said first sealing means comprises two spaced nuts threadably disposed on said outer tube, and a flexible resilient cylindrical seal disposed around said beer rod between said nuts and squeezed therebetween whereby said resilient seal collapses into sealing engagement with said beer rod and said outer tube.

3. The device recited in claim 1 wherein said intermediate sealing means comprises a flexible sealing member disposed around said beer rod, an outer intermediate tube making up part of said outer tube, said outer intermediate tube being threadably attached to a part of said outer tube, and means between said intermediate tube and said outer tube to squeeze said sealing member whereby it is compressed into sealing relation with said outer tube and said intermediate tube.

4. A device for carbonating and decarbonating beverages and dispensing said beverages under pressure comprising means for inserting a gas above the top of liquid in a keg, means to insert a second gas into the bottom of the liquid whereby it bubbles through the liquid to the top thereof, said means comprising a first, a second, a third, and a fourth solenoid operated valve, said first and second solenoid valves being connected respectively to said first and said second source of gas and having their discharges connected to a common pipe, said common pipe being connected to said third and fourth solenoid valves, said third solenoid valve having its discharge connected to said means to insert said gas above the liquid and said fourth solenoid valve being connected to said means to insert said gas to the bottom of said liquid, a power source, and a selector switch for selectively opening said third solenoid valve and said fourth solenoid valve.

5. The device recited in claim 4 wherein a pilot light is provided to indicate when said first valve is connected to said power source.

6. The device recited in claim 4 wherein a fifth solenoid valve is connected to the space above said liquid in said keg and discharges to the atmosphere, a bleeder switch selectively connects said selector switch to said source of power or said fifth solenoid valve to said source of power, and a third switch connects said source of power to said bleeder switch and to a timer, said bleeder switch being spring biased away from connecting said selector switch to said fifth valve.

7. The device recited in claim 4 wherein a timer is provided, a power switch having its common terminal connected to a source of electrical power and one pole connected to a normally open pole on said timer, said normally open pole being connected to said first solenoid valve whereby said first solenoid valve is held open a predetermined time when said timer normally open pole is closed, a movable switch on said timer operable to close said normally open pole, said movable switch being connected to the common pole of said selector switch, said selector switch selectively connecting said third or said fourth solenoid valve to said common pole on said timer whereby gas from said first or said second solenoid valve can be put either through said third or fourth solenoid valve for a predetermined time, said power switch having a second terminal connectable to its common terminal to connect said first solenoid valve and the common terminal of said selector switch to said source of power.

8. The device recited in claim 6 wherein a power switch has its common terminal connected to a source of electrical power and one pole connected to a normally open pole on said timer, said normally open pole being connected to said first solenoid valve whereby said first solenoid valve is held open a predetermined time when said timer normally open pole is closed, a movable switch on said timer operable to close said normally open pole, said movable switch being connected to the common pole of said selector switch, said selector switch selectively connecting said third or said fourth solenoid valve to said comomn pole on said timer whereby gas from said first or said second solenoid valve can be put either through said third or fourth solenoid valve for a predetermined time, said power switch having a second terminal connectable to its common terminal to connect said first solenoid valve and the common terminal of said selector switch to said source of power.

9. The device recited in claim 8 wherein a second selector switch is connected between said first selector switch and the second terminal of said power switch, said second selector switch having separate terminals connectable to its common terminal, one said separate terminal being connected to said common terminal of said first selector switch and the other said separate terminal of said second selector switch being connected to said fifth solenoid valve.

References Cited in the file of this patent
UNITED STATES PATENTS

| | | |
|---|---|---|
| 1,991,264 | Thomas et al. | Feb. 12, 1935 |
| 2,241,018 | Lloyd | May 6, 1941 |
| 2,390,425 | Crum | Dec. 4, 1945 |
| 2,742,048 | Kromer | Apr. 17, 1956 |

FOREIGN PATENTS

| | | |
|---|---|---|
| 564,815 | Canada | Oct. 21, 1958 |